United States Patent [19]
Kadota et al.

[11] Patent Number: 4,934,987
[45] Date of Patent: Jun. 19, 1990

[54] BELT TENSIONER

[75] Inventors: Yasushi Kadota, Osaka; Sadakatsu Ushio, Otsu, both of Japan

[73] Assignees: Koyo Seiko Co., Ltd., Osaka; Mitsubishi Jidosha Kogyo Kabushiki Kaisha, Tokyo, both of Japan

[21] Appl. No.: 331,130

[22] Filed: Mar. 31, 1989

[30] Foreign Application Priority Data
Apr. 1, 1988 [JP] Japan .................. 63-81523

[51] Int. Cl.$^5$ .............................................. F16H 7/12
[52] U.S. Cl. .................................... 474/112; 474/135
[58] Field of Search .................. 474/101, 109–117, 474/132, 135, 136, 138

[56] References Cited
U.S. PATENT DOCUMENTS
4,634,407 1/1987 Holtz .................... 474/112
4,832,665 5/1989 Kadota et al. .......... 474/112

FOREIGN PATENT DOCUMENTS
0072134 2/1983 European Pat. Off. ..

Primary Examiner—Thuy M. Bui
Attorney, Agent, or Firm—Armstrong, Nikaido, Marmelstein, Kubovcik & Murray

[57] ABSTRACT

A belt tensioner comprising an intermediate annular member rotatably provided around a fixed member in the form of a solid cylinder and to be secured to a stationary portion, a movable eccentric member in the form of a solid cylinder and rotatably provided around the intermediate annular member eccentrically therewith, an idler in the form of a hollow cylinder and rotatably provided around the movable eccentric member for contact with a belt, and a spring provided between the stationary portion or the fixed member and the movable eccentric member for biasing the movable eccentric member in a direction to bring the idler into pressing contact with the belt. The intermediate annular member has a cylindrical or tapered first sliding surface in contact with the fixed member and a cylindrical or tapered second sliding surface in contact with the eccentric member. One of the first and second sliding surfaces of the annular member is a high-friction sliding surface, and the other surface is a low-friction sliding surface. An oil of high viscosity is provided between the low-friction sliding surface and the surface of the fixed member or the eccentric member in contact therewith.

4 Claims, 7 Drawing Sheets

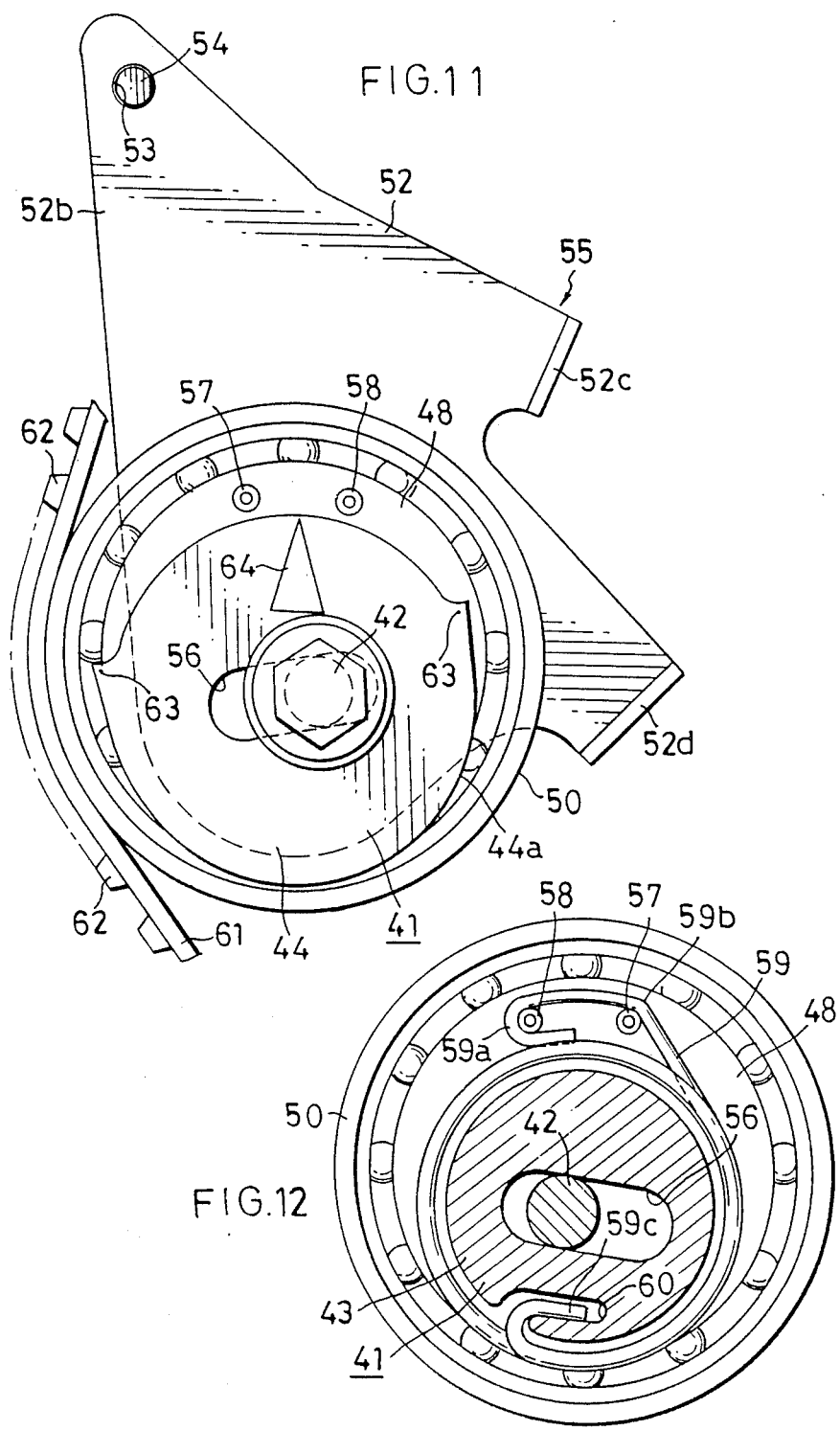

BELT TENSIONER

BACKGROUND OF THE INVENTION

The present invention relates to belt tensioners, and more particularly to belt tensioners for adjusting the tension, for example, on the timing belt reeved around a pulley on the crankshaft of the motor vehicle engine and a camshaft pulley.

Motor vehicle engines are provided with a timing belt for rotating the crankshaft and the camshaft in synchronism. Belt tensioners are developed for adjusting the tension on the timing belt.

Many belt tensioners of this type have been proposed which include a damping mechanism for avoiding resonance due to tensile vibration of the belt. Such known belt tensioners include one comprising a solid cylindrical fixed member to be fastened to the engine block or like stationary portion, a movable eccentric member rotatably provided around the fixed member eccentrically therewith and corresponding to a bearing inner ring, with an oil of high viscosity provided therebetween, an idler rotatably provided around the eccentric member and corresponding to a bearing outer ring, and a spring provided between the fixed member and the eccentric member for biasing the idler into pressing contact with the timing belt, the idler being movable about the fixed member to adjust the belt tension (see Unexamined Japanese Patent Publication SHO 63-47551).

With the belt tensioner described above, the viscous resistance of the high-viscosity oil serves to inhibit the resonance due to the tensile vibration of the belt.

The belt tensioner, which is disposed on the slack side of the belt, has the problem that when the belt slacks abruptly, the idler is unable to follow the belt since the idler moves slowly owing to the viscous resistance of the oil. Troubles are therefore likely to develop when the engine is rapidly accelerated or is brought to a halt. For example, when the engine is stopped, the crankshaft instantaneously rotates reversely, greatly increasing the tension on the slack side of the belt on which the tensioner is disposed. Consequently, it is likely that the idler will stop as moved greatly away from the belt by being pushed by the belt. The slack side of the belt rapidly slacks when the engine is subsequently started, whereas the idler, if at a stop as moved greatly away from the belt, fails to follow the rapidly slacking belt. As a result, the timing belt slips relative to the pulley, jumping over some teeth to result in an engine trouble.

SUMMARY OF THE INVENTION

The main object of the present invention is to provide a belt tensioner having a damping function and capable of immediately following abrupt or rapid slacking of the belt.

The belt tensioner of the invention comprises an intermediate annular member rotatably provided around a fixed member in the form of a solid cylinder and to be secured to a stationary portion, a movable eccentric member in the form of a solid cylinder and rotatably provided around the intermediate annular member eccentrically therewith, an idler in the form of a hollow cylinder and rotatably provided around the movable eccentric member for contact with a belt, and a spring provided between the stationary portion or the fixed member and the movable eccentric member for biasing the movable eccentric member in a direction to bring the idler into pressing contact with the belt, the intermediate annular member having a cylindrical or tapered first sliding surface in contact with the fixed member and a cylindrical or tapered second sliding surface in contact with the movable eccentric member, one of the first and second sliding surfaces of the intermediate annular member being a high-friction sliding surface, the other sliding surface being a low-friction sliding surface, an oil of high viscosity being provided between the low-friction sliding surface and the surface of the fixed member or the movable eccentric member in contact therewith.

The intermediate annular member may be in the form of a hollow cylinder. In this case, the inner periphery of the annular member is the first sliding surface in contact with the outer periphery of the fixed member, and the outer periphery of the annular member is the second sliding surface in contact with the inner periphery of the movable eccentric member.

The intermediate annular member may have a flange extending outward from each of the opposite ends of the hollow cylindrical portion thereof. In this case, the movable eccentric member is provided around the cylindrical portion of the annular member between the flanges. The outer periphery of each flange of the annular member serves as the first sliding surface in contact with the inner periphery of an extension extending outward from the fixed member to outside the flange. The outer periphery of the cylindrical portion of the annular member serves as the second sliding surface in contact with the inner periphery of the movable eccentric member. The first sliding surface is the high-friction sliding surface, and the second sliding surface is the low-friction sliding surface.

In the case where the first sliding surface of the intermediate annular member in contact with the fixed member is the high-friction sliding surface, the second sliding surface of the annular member in contact with the eccentric member is the low-friction sliding surface. The high-viscosity oil is provided between the low-friction sliding surface and the surface of the eccentric member. Conversely, when the second sliding surface of the annular member in contact with the eccentric member is the high-friction sliding surface, the first sliding surface of the annular member in contact with the fixed member serves as the low-friction surface. The high-viscosity oil is provided between this low-friction sliding surface and the surface of the fixed member in contact therewith.

Between the high-friction sliding surface of the intermediate annular member and the surface in contact therewith, the static friction is great when the surfaces are subjected to a great vertical load, permitting no sliding between the surfaces. Sliding is liable to occur when the vertical load decreases since the static friction then also diminishes. On the other hand, the low-friction surface of the annular member slides relative to the surface in contact therewith regardless of the magnitude of the vertical load, whereas the sliding occurs slowly owing to the presence of the high-viscosity oil between the two surfaces.

When the tension on the belt increases, the belt exerts a great radial load on the eccentric member through the idler, increasing the vertical load between the high-friction sliding surface of the annular member and the surface in contact therewith. The increased static friction between these surface locks the surfaces to each other against rotation. A damping effect is afforded by the viscous drag of the high-viscosity oil between the low-friction surface of the annular member and the surface in contact therewith.

When the belt tension decreases, the radial load delivered from the belt to the eccentric member decreases, consequently diminishing the vertical load between the high-friction sliding surface of the annular member and the surface in contact therewith and rendering these surfaces easy to slide relative to each other. The elastic force of the spring therefore immediately rotates the eccentric member, permitting the idler to follow the slacking of the belt.

Thus, the belt tensioner of the present invention has a damper function, immediately follows rapid slacking of the timing belt and accordingly precludes the belt from disengaging from some pulley teeth to avoid the possible engine trouble.

The intermediate annular member, when in the form of a hollow cylinder with a small wall thickness, can be readily inserted between the fixed member and the movable eccentric member. This makes it possible to obtain a belt tensioner at a low cost with improved performance. Moreover, the annular member of thin wall permits the fixed member to have an increased outside diameter to result in a satisfactory damper effect.

In the case where the annular member comprises a hollow cylinder portion and outward flanges at the respective ends of the portion, with the outer periphery of each flange serving as the high-friction sliding surface, the sliding surface can be given an increased diameter. This assures the action of frictional resistance when the surfaces are subjected to a vertical load. When the high-friction sliding surfaces of the flanges are tapered in directions opposite to each other, these sliding surfaces are given a correspondingly increased area, while the wedge action of the tapered surfaces produces an increased bearing pressure to result in increased frictional resistance.

BRIEF DESCRIPTION OF THE DRAWINGS

FIG. 11 is a view showing the second embodiment as it is seen in the direction of arrows XI—XI in FIG. 9;

FIG. 12 is a view in section taken along the line XII—XII in FIG. 9;

DESCRIPTION OF THE PREFERRED EMBODIMENTS

With reference to the accompanying drawings, the present invention will be described below as it is embodied for use with the timing belt reeved around the crankshaft and camshaft of a motor vehicle engine.

Figure 1:
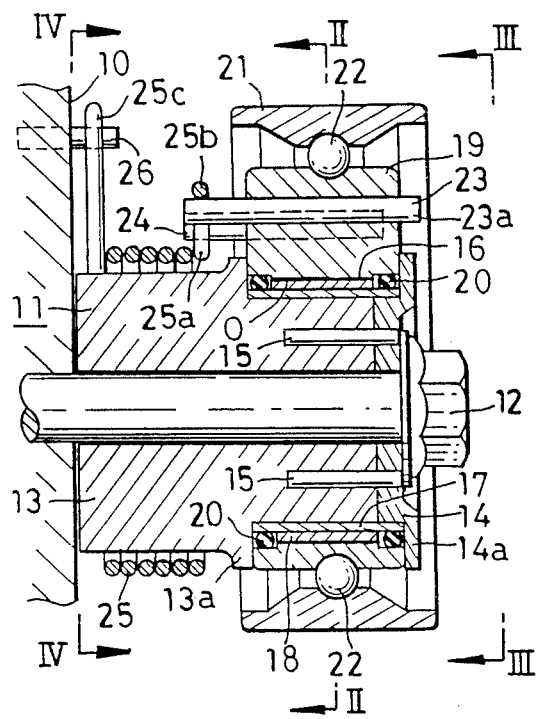
FIG. 1 is a view in vertical section (taken along the line I—I in FIG. 2) showing a belt tensioner embodying the invention, i.e., a first embodiment.
Figure 2:
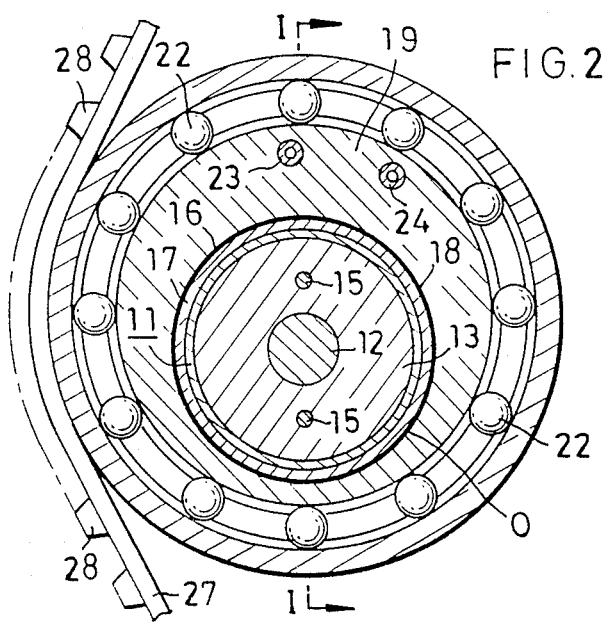
FIG. 2 is a view in section taken along the line II—II in FIG. 1.
Figure 3:
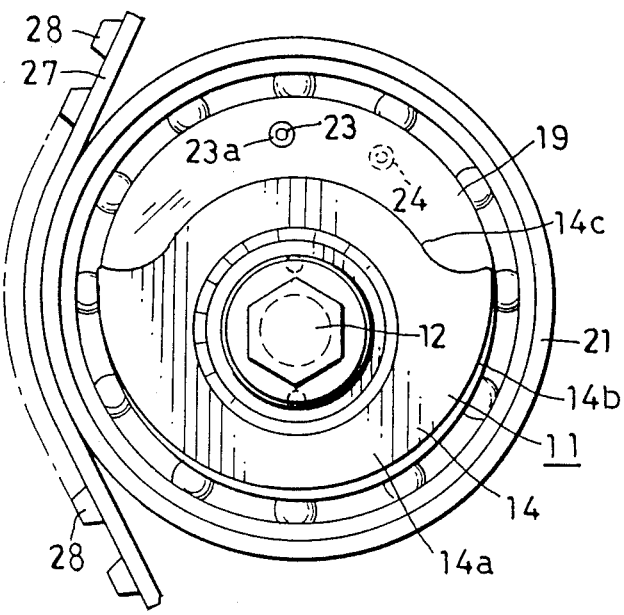
FIG. 3 is a view showing the embodiment as it is seen in the direction of arrows III—III in FIG. 1.
Figure 4:
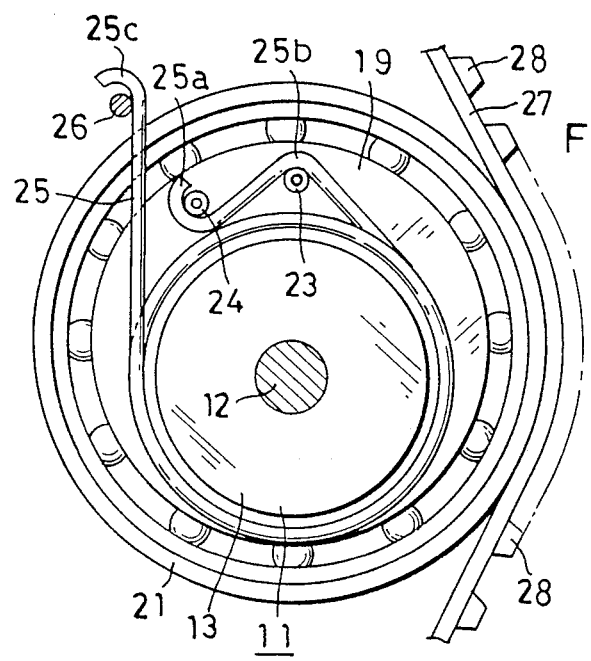
FIG. 4 is a view in section taken along the line IV—IV in FIG. 1.
Figure 5:
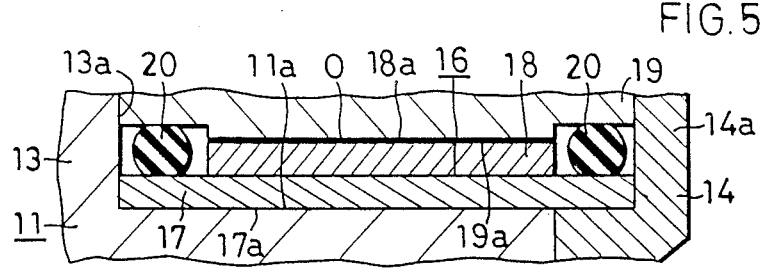
FIG. 5 is a fragmentary view in vertical section showing the intermediate sleeve in FIG. 1 on an enlarged scale.

FIGS. 1 to 4 show a first embodiment, and FIG. 5 is an enlarged fragmentary view of the same.

A fixed member 11 in the form of a solid cylinder is secured to a stationary portion 10 of the engine (e.g. the engine block) with a single bolt 12. The fixed member 11 comprises a shank 13 toward the stationary portion 10 (toward the base end of the member 11) and a plate 14 at the opposite side of the member 11 (at the front end thereof). The plate is fixed to the shank with pins 15. Flanges 13a, 14a are formed integrally with an intermediate portion of the shank 13 and the plate 14, respectively. The outer peripheray of the fixed member 11 provides a high-friction sliding surface 11a between the flanges 13a, 14a. The fixed member 11 may be made of a material, such as steel, having a great coefficient of friction to directly form the sliding surface 11a on its outer peripheray. Alternatively, a high-friction material may be bonded to or formed as a coating on the outer periphery of the fixed member 11 to provide the surface 11a.

An intermediate sleeve (intermediate annular member) 16 is rotatably provided around the high-friction surface 11a of the fixed member 11. The sleeve 16 comprises an inner high-friction member 17 and a low-friction member 18 secured to the outer periphery thereof. The high-friction member 17 is made of steel or other material having a great coefficient of friction and has an inner periphery serving as a high-friction sliding surface 17a. The low-friction member 18 is made of fluorocarbon resin or other material having a small coefficient of friction and has an outer periphery serving as a low-friction sliding surface 18a. In outside diameter, the outer periphery, i.e. the low-friction sliding surface 18a, of the sleeve 16 is smaller than the flanges 13a, 14a of the fixed member 11. The low-friction member 18 is slightly smaller than the high-friction member 17 in width.

A movable eccentric member 19 in the form of a short solid cylinder is eccentrically rotatably provided around the low-friction sliding surface 18a of the sleeve 16 between the flanges 13a, 14a of the fixed member 11. The inner periphery of the eccentric member 19 provides a low-friction sliding surface 19a. The inner periphery of the eccentric member 19 may serve as it is as the sliding surface 19a, or a low-friction material may be bonded to or provided as a coating on the inner periphery of the eccentric member 19 to form the sliding surface 19a. Silicone oil O having a viscosity, for example, of at least 100,000 cst (25° C.) is provided between the low-friction sliding surface 18a of the sleeve 16 and the low-friction sliding surface 19a of the eccentric member 19. An O-ring 20 for confining the oil O is disposed at each side of the low-friction member 18 of the sleeve 16 between the outer periphery of the high-friction member 17 of the sleeve and the eccentric member 19.

A hollow cylindrical idler 21 is rotatably provided around the eccentric member 19 with a plurality of spherical rolling members 22 interposed therebetween.

Two pins, i.e., first and second pins 23, 24, are secured to the eccentric member 19 and extend in parallel to the axis thereof. The first pin 23 projects from opposite sides of the eccentric member 19 and has a forward end serving as a stopper 23a. The second pin 24 projects from the eccentric member 19 only at its base end. A coiled torsion spring 25 is provided around the shank 13 of the fixed member 11 over the portion thereof between its base end and the flange 13a. The spring 25 has one end 25a engaged with the second pin 24 on the eccentric member 19, a bent portion 25b close to the end 25a and engaged with the first pin 23 on the member 19, and the other end 25c engaged with a third pin 26 anchored in the fixed portion 10. The spring 25 biases the eccentric member 19 counterclockwise in FIGS. 2 and 3 to press the idler 21 against the slack side of a timing belt 27 on one surface thereof having no teeth 28.

The flange 14a of the plate 14 of the fixed member 11 comprises a large-diameter portion 14b extending over about one-half of the circumference and a small-diameter portion 14c approximately over the remaining one-half of the circumference. The range of rotation of the eccentric member 19 is limited by the contact of the stopper portion 23a of the first pin 23 on the eccentric member 19 with the circumferentially opposite ends of the large-diameter portion 14b. While the tensioner is in operation, the stopper portion 23a of the first pin 23 is positioned at the circumferential midportion of the flange small-diameter portion 14c, rendering the eccentric member 19 rotatable relative to the fixed member 11 in either direction.

Next, the operation of the belt tensioner will be described.

The static friction between the high-friction sliding surface 17a of the sleeve 16 and the high-friction surface 11a of the fixed member 11 in contact therewith is great when the vertical load is great, so that no sliding occurs. However, the two surfaces tend to slide easily when the vertical load decreases since the static friction then also decreases. On the other hand, the low-friction sliding surface 18a of the sleeve 16 and the low-friction sliding surface 19a of the eccentric member 19 slide relative to each other regardless of the magnitude of the vertical load, but the sliding occurs slowly owing to the presence of the high-viscosity oil O.

When the tension on the belt 27 increases, the belt 27 exerts a great radial load on the eccentric member 19 through the idler 21, increasing the vertical load between the high-friction sliding surface 17a of the sleeve 16 and the high-friction sliding surface 11a of the fixed member 11 in contact therewith, with the result that the two surfaces are locked to each other by the resulting increased static friction to hold the sleeve against rotation. A damper effect is then afforded by the viscous drag of the high-viscosity oil which is present between the low-friction sliding surface 18a of the sleeve 16 and the low-friction sliding surface 19a of the eccentric member 19 in contact therewith. More specifically, when the tension varies moderately, for example, owing to temperature variations, the low-friction sliding surface 18a of the sleeve 16 and the like surface 19a of the eccentric member 19 slide relative to each other, permitting the radial load delivered from the belt 27 to slowly rotate the eccentric member 19 clockwise in FIG. 2 against the spring 25. Consequently, the idler 21 slowly moves in a direction to diminish the tension, whereby the tension is maintained at a predetermined value. On the other hand, a high-frequency vibration load such as the vibration of the belt increases the viscous damping coefficient of the oil O between the low-friction sliding surface 18a of the sleeve 16 and the low-friction sliding surface 19a of the eccentric member 19, making these surfaces less slidable relative to each other and thereby hindering the rotation of the eccentric member 19, that is, the movement of the idler 21, hence a damping effect.

When the tension on the belt 27 decreases, the radial load delivered from the belt 27 to the eccentric member 19 decreases, consequently diminishing the vertical load and static friction between the high-friction sliding surface 17a of the sleeve 16 and the high-friction sliding surface 11a of the fixed member 11 in contact therewith to render these surfaces easily slidable relative to each other. On the other hand, the low-friction sliding surface 18a of the sleeve 16 and the low-friction sliding surface 19a of the eccentric member 19 are not easily slidable owing to the great viscous damping coefficient of the viscous oil O therebetween, whereas the eccentric member 19 and the sleeve 16 are rapidly rotated by the spring 25 relative to the fixed member 11 counterclockwise in FIG. 2 since the sleeve surface 17a and the fixed member surface 11a become easily slidable as stated above. As a result, the idler 21 rapidly moves toward the belt 27 to immediately follow the slacking of the belt 27.

Accordingly, even if the belt 27 markedly slacks on its slack side when the engine is started subsequent to stopping, the idler rapidly follows the slacking, precluding the belt 27 from jumping over some teeth.

Figure 6:
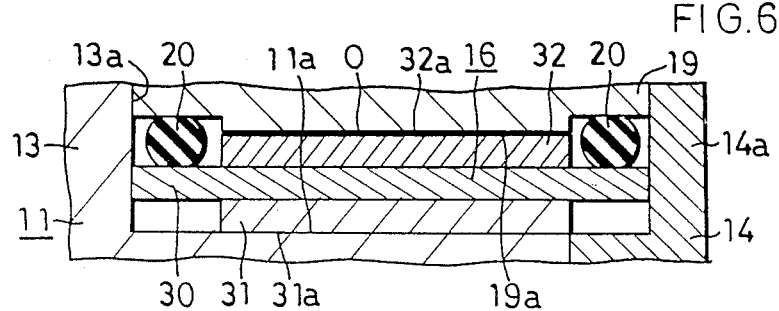
FIG. 6 is a view corresponding to FIG. 5 and showing a modified intermediate sleeve.

FIG. 6 shows a modified intermediate sleeve 16. The sleeve 16 comprises a core 30, a high-friction member 31 secured to the inner periphery of the core 30, and a low-friction member 32 secured to the outer periphery of the core 30. The core 30 is made of a suitable material such as steel. The inner periphery of the high-friction material 31 provides a high-friction sliding surface 31a, and the outer periphery of the low-friction material 32 provides a low-friction sliding surface 32a. Silicone oil O is provided between the low-friction sliding surface 32a of the sleeve 16 and the low-friction sliding surface 19a of the eccentric member 19. Between the outer periphery of the core 30 and the eccentric member 19, an O-ring is interposed as positioned at each side of the low-friction member 32 of the sleeve 16.

With the exception of the above feature, the sleeve 16 has the same construction as the one shown in FIGS. 1 to 5. Throughout the drawings concerned, like parts are designated by like reference numerals.

Figure 7:
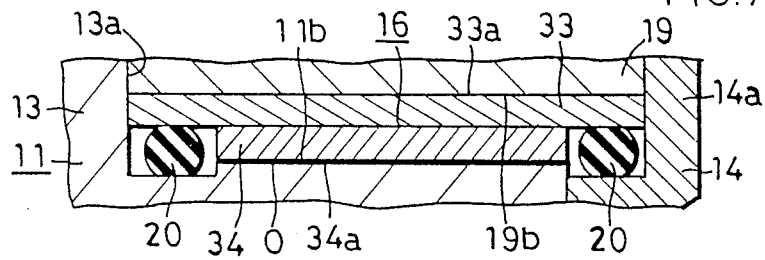
FIG. 7 is a view corresponding to FIG. 5 and showing another modified intermediate sleeve.

FIG. 7 shows another modified intermediate sleeve 16.

The sleeve 16 comprises an outer high-friction member 33 and a low-friction member 34 secured to the inner periphery thereof. The outer periphery of the high-friction member 33 provides a high-friction sliding surface 33a, and the inner periphery of the low-friction member 34 a low-friction sliding surface 34a. In corresponding relation to these surfaces, a low-friction sliding surface 11b is formed on the outer periphery of the fixed member 11, and a high-friction sliding surface 19b on the inner periphery of the eccentric member 19. Silicone oil O is provided between the low-friction sliding surface 34a of the sleeve 16 and the low-friction sliding surface 11b of the fixed member 11. At each side of the low friction member 34 of the sleeve 16, an O-ring 20 is interposed between the inner periphery of the high-friction member 33 and the fixed member 11.

In this case, the belt tensioner operates as follows.

When the tension on the belt 27 builds up, the belt 27 exerts a great radial load on the eccentric member 19 through the idler 21, thereby increasing the vertical load between the high-friction sliding surface 33a of the sleeve 16 and the high-friction sliding surface 19b of the eccentric member 19 in contact therewith, with the result that these two surfaces are locked to each other by the resulting increased static friction to prevent the rotation of the sleeve 16 and the eccentric member 19 relative to each other. A damper effect is then afforded by the viscous drag of the high-viscosity oil O which is present between the low-friction sliding surface 34a of the sleeve 16 and the low-friction sliding surface 11b of the fixed member 11 in contact therewith. More specifically, when the tension varies moderately, for example, owing to temperature variations, the low-friction sliding surface 34a of the sleeve 16 and the like surface 11b of the fixed member 11 slide relative to each other, permitting the radial load delivered from the belt 27 to slowly rotate the eccentric member 19 and the sleeve 16 against the spring 25. Consequently, the idler 21 slowly moves in a direction to diminish the tension, whereby the tension is maintained at a predetermined value. In contrast, a high-frequency vibration load such as the vibration of the belt increases the viscous damping coefficient of the oil O between the low-friction sliding surface 34a of the sleeve 16 and the low-friction sliding surface 11b of the fixed member 11, making these surfaces less slidable relative to each other and thereby hindering the rotation of the eccentric member 19 and the sleeve 16, i.e. the movement of the idler 21, hence a damping effect.

When the tension on the belt 27 decreases, the radial load delivered from the belt 27 to the eccentric member 19 decreases, consequently diminishing the vertical load and static friction between the high-friction sliding surface 33a of the sleeve 16 and the high-friction sliding surface 19b of the eccentric member 19 in contact therewith to render these surfaces easily slidable relative to each other. On the other hand, the low-friction sliding surface 34a of the sleeve 16 and the low-friction sliding surface 11b of the fixed member 11 in contact therewith are not easily slidable owing to the great viscous damping coefficient of the high-viscosity oil O therebetween, whereas the eccentric member 19 rapidly rotates under the action of the spring 25 since the high-friction sliding surfaces 33a, 19b of the sleeve 16 and the eccentric member 19 become easily slidable as stated above. As a result, the idler 21 rapidly moves toward the belt 27 to promptly follow the slacking of the belt 27.

With the exception of the above, the tensioner incorporating the sleeve 16 of FIG. 7 is the same as the one shown in FIGS. 1 to 5. Throughout the drawings concerned, like parts are designated by like reference numbers or symbols.

Figure 8:
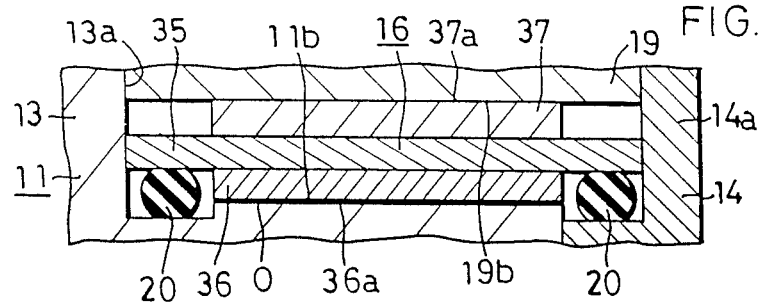
FIG. 8 is a view corresponding to FIG. 6 and showing another modified intermediate sleeve.
Figure 9:
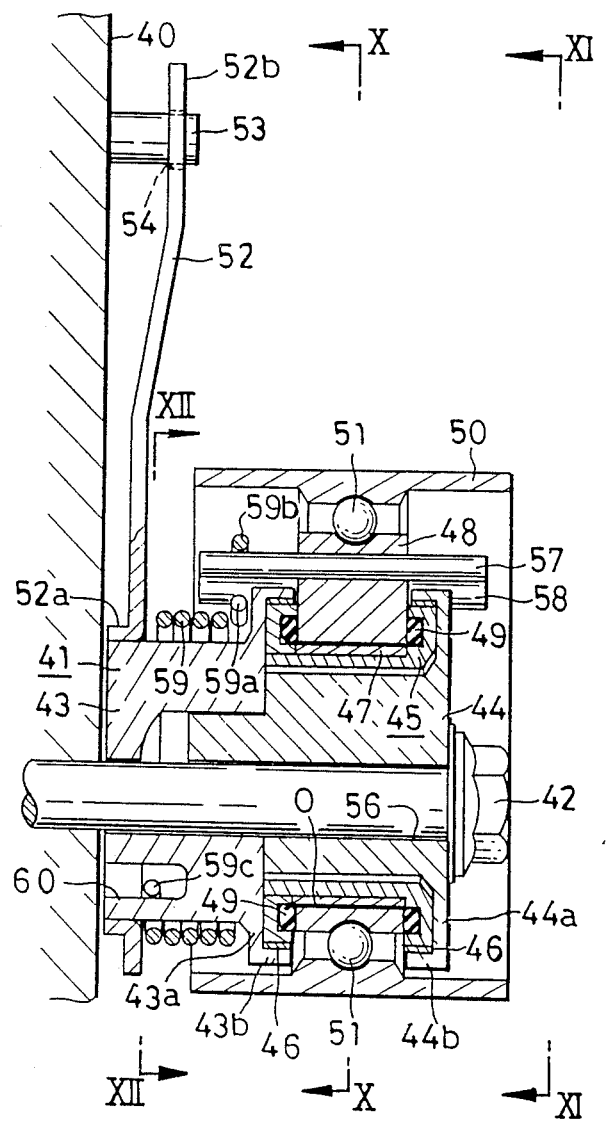
FIG. 9 is a view in vertical section (taken along the line IX—IX in FIG. 10) showing another belt tensioner of the invention, i.e., a second embodiment.
Figure 10:
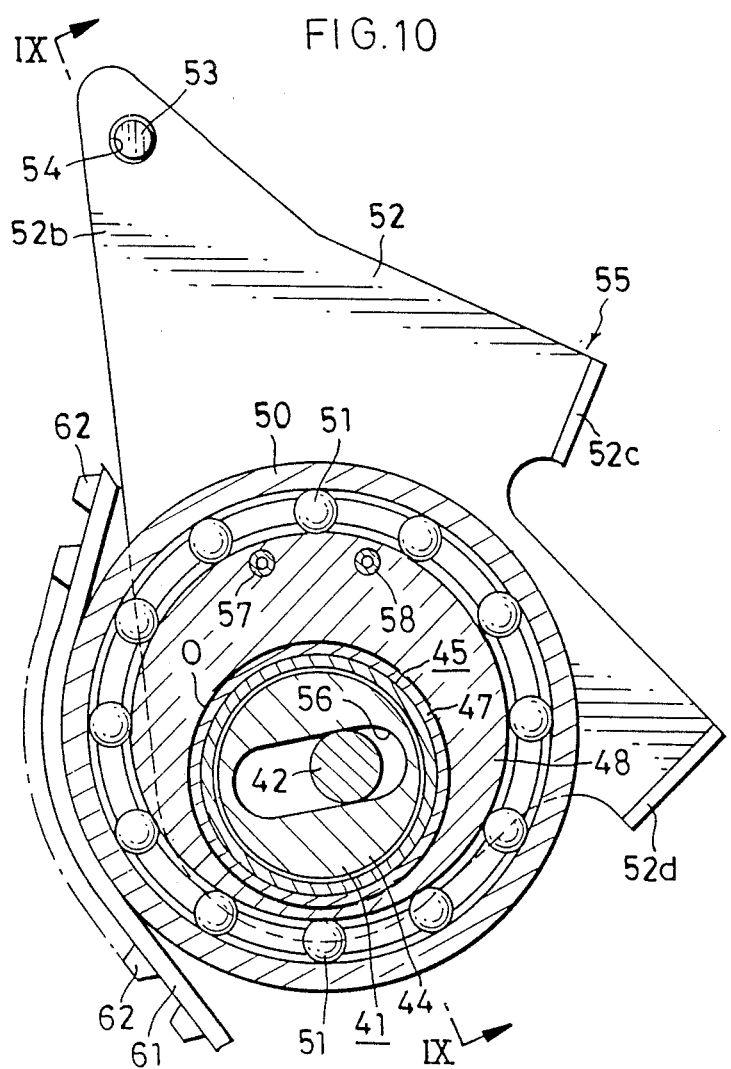
FIG. 10 is a view in section taken along the line X—X in FIG. 9.

FIG. 8 shows still another modified intermediate sleeve 16.

The sleeve 16 comprises a core 35, a low-friction member 36 secured to the inner periphery of the core 35, and a high-friction member 37 secured to the outer periphery of the core 35. The inner periphery of the low-friction member 36 provides a low-friction sliding surface 36a, and the outer periphery of the high-friction member 37 serves as a high-friction sliding surfaces 37a. Silicone oil O is provided between the low-friction sliding surface 36a of the sleeve 16 and a low-friction sliding surface 11b formed on the fixed member 11. At opposite sides of the low-friction member 36 of the sleeve 16, O-rings 20 are disposed as interposed between the inner periphery of the core 35 and the fixed member 11.

With the exception of the above feature, the arrangement shown in FIG. 8 is the same as the one shown in FIG. 7. Like parts are designated by like reference numerals or symbols.

Although the low-friction members 18, 34 are secured to the high-friction members 17, 33, respectively, in the case of FIGS. 5 and 7, the low-friction member may be in the form of a thin coating formed over the surface of the high-friction member. Further although the high-friction members 31, 37 and the low-friction members 32, 36 are secured to the cores 30, 35 in the case of FIGS. 6 and 8, the high-friction member and the low-friction member may be provided each in the form of a thin coating over the respective surfaces of the core.

Figure 13:
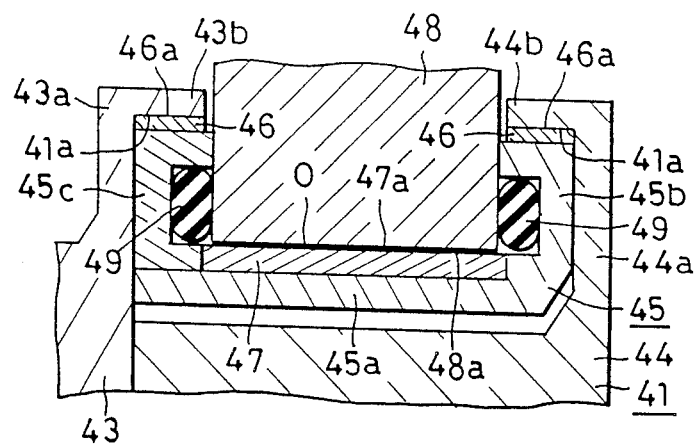
FIG. 13 is a fragmentary view in vertical section showing the intermediate annular member of FIG. 9 on an enlarged scale.

FIGS. 9 to 12 show a second embodiment, and FIG. 13 is a fragmentary enlarged view of the same.

A fixed member 41 in the form of a solid cylinder is fastened to a stationary portion 40 of an engine with a bolt 42. The fixed member 41 comprises a first shank portion 43 toward its base end and a second shank portion 44 positioned toward its front end and secured to the portion 43 by a press fit. The two shank portions 43, 44 are integrally provided with outward flanges 43a, 44a, respectively. These flanges 43a, 44a are integrally formed with extensions 43b, 44b extending from their respective outer peripheries toward each other and each in the form of a short hollow cylinder. Each of the extensions 43b, 44b has an inner periphery providing a high-friction sliding surface 41a.

An intermediate annular member 45 is rotatably provided around the second shank portion 44 of the fixed member 41 between the two flanges 43a, 44a. The annular member 45 comprises a hollow cylindrical portion 45a having first and second outward flanges 45b, 45c at its respective ends. The first flange 45b at the front end is integral with the cylindrical portion 45a. The second flange 45c at the base end is separate from but secured to the cylindrical portion 45a. The cylindrical portion 45a of the annular member 45 has an inside diameter slightly larger than the outside diameter of the second shank portion 44 of the fixed member 41 to form a clearance between the portions 45a and 44. A high-friction member 46 is secured to the outer periphery of each of the two flanges 45b, 45c of the annular member 45 and has an outer periphery providing a high-friction sliding surface 46a. A low-friction member 47 is secured to the outer periphery of the annular member cylindrical portion 45a and has an outer periphery providing a low-friction sliding surface 47a.

Between the flanges 45b, 45c of the annular member 45, a movable eccentric member 48 in the form of a short solid cylinder is eccentrically rotatably provided around the cylindrical portion 45a. The inner periphery of the eccentric member 48 provides a low-friction sliding surface 48a. Silicone oil O having a viscosity, for example, of at least 100,00 cst (25° C.) is provided between the low-friction sliding surface 47a of the annular member 45 and the low-friction sliding surface 48a of the eccentric member 48. An O-ring 49 for confining the oil O is interposed between each of the side flanges 45b, 45c of the annular member 45 and the end face, opposed thereto, of the eccentric member 48.

An idler 50 in the form of a hollow cylinder is rotatably provided around the eccentric member 48 with a plurality of spherical rolling members 51 interposed therebetween.

A bracket 52 has a short cylindrical portion 52a fixedly fitted around the base end of the fixed member 41 by suitable means as by a press fit. An engaging portion 52b integral with the bracket 52 extends upward therefrom and if formed in its upper end with a hole 54 having fitted therein an engaging pin 53 anchored in the stationary portion 40. Two portions projecting from one side of the bracket 52 and integral therewith are individually bent at a right angle to provide lugs 52c, 52d at their outer ends. These lugs serve as a loading portion 55 for applying a force to rotate the bracket 52 in assembling the parts. The fixed member 41 has a bolt slot 56 extending generally along a circle centered about the hole 54 in the bracket 52.

Two pins 57, 58 are fixed to the eccentric member 48 and extend therethrough in paralle to its axis to project from opposite sides of the member 48. The fixed member first shank portion 43 has a coiled torsion spring 59 around the portion thereof between the flange 43a and the base end thereof. The spring 59 has one end 59a engaged with the second pin 58 on the eccentric member 48, a bent portion 59b close to the end 59a and engaged with the first pin 57 on the eccentric member 48, and the other portion 59c engaged in a circuit 59 formed in the outer periphery of the base end of the first shank portion 43. The spring 59 biases the eccentric member 48 counterclockwise in FIGS. 10 and 11, pressing the idler 50 against the slack side of a timing belt 61 on the surface thereof having no teeth 62.

The flange 44a of the second shank portion 44 of the fixed member 41 has two projections 63 integral therewith and spaced apart along its outer periphery. The contact of the two pins 57, 58 on the eccentric member 48 with the respective projections 63 limits the range of rotation of the eccentric member 48. The flange 44a of the second shank portion 44 bears an indicator mark 64 at the circumferential midportion between the projections 63. While the tensioner is in operation, the eccentric member 19 is rotatable relative to the fixed member 41 in either direction, with the mark 64 positioned between the two pins 57, 58.

The belt tensioner of the second embodiment operates in the same manner as the first embodiment.

When the tensioner on the belt 61 builds up, the belt 61 exerts a great radial load on the eccentric member 48 through the idler 50, thereby increasing the vertical load between each of the high-friction sliding surfaces 46a of the annular member 45 and the high-friction sliding surface 41a of the fixed member 41 in contact therewith, with the result that these two surfaces are locked to each other by the resulting increased static friction to prevent the rotation of the annular member 45 and the fixed member 41 relative to each other. A damper effect is then afforded by the viscous drag of the high-viscosity oil O present between the low-friction sliding surface 47a of the annular member 45 and the low-friction sliding surface 48a of the eccentric member 48 in contact therewith.

When the tension on the belt 61 decreases, the radial load delivered from the belt 61 to the eccentric member 48 decreases, consequently diminishing the vertical load and static friction between each high-friction sliding surface 46a of the annular member 45 and the high-friction sliding surface 41a of the fixed member 41 in contact therewith to render these surfaces easily slidable relative to each other. Consequently, the eccentric member 48 rapidly rotates under the action of the spring 59 to move the idler 50 rapidly toward the belt 61, permitting the idler 50 to promptly follow the slacking of the belt 61.

In the case of the second embodiment, the high-friction sliding surface 46a is formed on the outer periphery of each of the flanges 45b, 45c of the annular member 45 and therefore has an increased diameter. This assures the action of frictional resistance when the opposed high-friction surfaces 46a, 41a are subjected to a vertical load.

Figure 14:
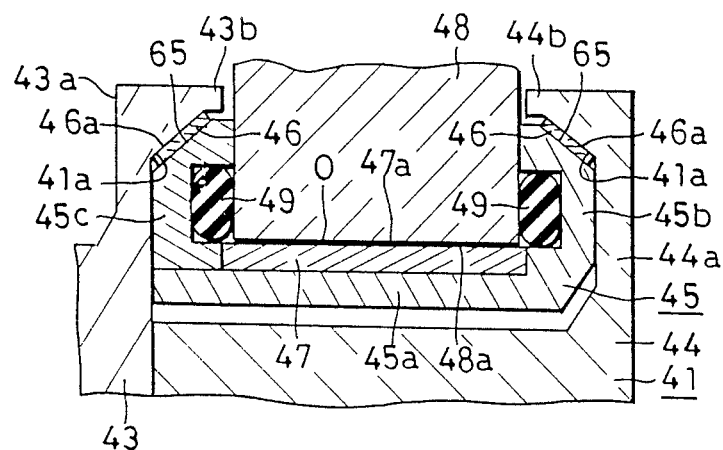
FIG. 14 is a view corresponding to FIG. 13 and showing a modified intermediate annular member.

FIG. 14 shows a modified annular member 45.

The annular member 45 has flanges 45b, 45c which are tapered at their respective outer peripheries in directions opposite to each other as indicated at 65. A high-friction member 46 is secured to each tapered surface 65. The extensions 43b, 44b of the fixed member 41 each have a high-friction sliding surface 41a, which is also tapered in corresponding relation to the tapered surface of the annular member 45.

The high-friction sliding surfaces 46a of the annular member 45 are thus tapered in directions opposite to each other and are therefore given a correspondingly increased area. Additionally, the wedge action of the tapered surfaces produces an increased bearing pressure to result in increased frictional resistance.

What is claimed is:

1. A belt tensioner comprising an intermediate annular member rotatably provided around a fixed member in the form of a solid cylinder and to be secured to a stationary portion, a movable eccentric member in the form of a solid cylinder and rotatably provided around the intermediate annular member eccentrically therewith, an idler in the form of a hollow cylinder and rotatably provided around the movable eccentric member for contact with a belt, and a spring provided between the stationary portion or the fixed member and the movable eccentric member for biasing the movable eccentric member in a direction to bring the idler into pressing contact with the belt, the intermediate annular member having a cylindrical or tapered first sliding surface in contact with the fixed member and a cylindrical or tapered second sliding surface in contact with the movable eccentric member, one of the first and second sliding surfaces of the intermediate annular member being a high-friction sliding surface, the other sliding surface being a low-friction sliding surface, an oil of high viscosity being provided between the low-friction sliding surface and the surface of the fixed member or the movable eccentric member in contact therewith.

2. A belt tensioner as defined in claim 1 wherein the intermediate annular member is in the form of a hollow cylinder, and the inner periphery of the annular member is the first sliding surface in contact with the outer periphery of the fixed member, the outer periphery of the annular member being the second sliding surface in contact with the inner periphery of the eccentric member.

3. A belt tensioner as defined in claim 1 wherein the annular member comprises a hollow cylindrical portion and a flange extending outward from each of opposite ends thereof, and the eccentric member is provided around the cylindrical portion of the annular member between the flanges, the outer periphery of each flange of the annular member being the first sliding surface in contact with the inner periphery of an extension extending outward from the fixed member to outside the flange, the outer periphery of the cylindrical portion of the annular member serving as the second sliding surface in contact with the inner periphery of the eccentric member, the first sliding surface being the high-friction sliding surface, the second sliding surface being the low-friction sliding surface.

4. A belt tensioner as defined in claim 3 wherein the first sliding surfaces provided by the the outer peripheries of the flanges of the annular member are tapered in directions opposite to each other.

* * * * *